(12) United States Patent
Foster (10) Patent No.: US 10,801,622 B2
(45) Date of Patent: Oct. 13, 2020

(54) INTERLOCKING FACE SEAL ASSEMBLIES AND RELATED METHODS

(71) Applicant: BAL SEAL ENGINEERING, LLC, Foothill Ranch, CA (US)

(72) Inventor: Mike Foster, Foothill Ranch, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 886 days.

(21) Appl. No.: 14/251,439

(22) Filed: Apr. 11, 2014

(65) Prior Publication Data

US 2014/0312570 A1    Oct. 23, 2014

Related U.S. Application Data

(60) Provisional application No. 61/813,494, filed on Apr. 18, 2013.

(51) Int. Cl.
*F16J 15/06* (2006.01)
*F16J 15/16* (2006.01)
(Continued)

(52) U.S. Cl.
CPC ............. *F16J 15/06* (2013.01); *F16J 15/027* (2013.01); *F16J 15/104* (2013.01); *F16J 15/166* (2013.01); *F16L 17/035* (2013.01); *F16L 17/073* (2013.01)

(58) Field of Classification Search
CPC .......... F16J 15/02; F16J 15/021; F16J 15/022; F16J 15/028; F16J 15/10; F16J 15/104; F16J 15/127
See application file for complete search history.

(56) References Cited

U.S. PATENT DOCUMENTS 2,330,197 A * 9/1943 Allen .................. F16L 27/0828
131/225
2,334,349 A * 11/1943 Mika .................... F16J 15/3252
277/577

(Continued)

FOREIGN PATENT DOCUMENTS

BE       408 271 A      4/1935
DE    27 59 141 A1      7/1979
(Continued)

OTHER PUBLICATIONS

Final Office Action on related U.S. Appl. No. (13/586,773) dated Sep. 22, 2017.
(Continued)

*Primary Examiner* — Vishal A Patel
(74) *Attorney, Agent, or Firm* — Klein, O'Neill & Singh, LLP (57) ABSTRACT

Supported face seal assemblies and related methods are disclosed. The supported face seal assemblies have spring energized seal element supported by a backing ring. When the two components are joined, they form an interlocking face seal assembly that is less prone to separate during installation and/or service. The methods disclosed include the steps of forming a spring energized sealing element with a convex outer surface, forming a backup or support ring with a concave inner surface, assembling the sealing element into the inner bore of the backup or support ring such that the concave inner surface accepts a portion of the convex outer surface and the sealing element is retained within the backup or support ring.

9 Claims, 5 Drawing Sheets

(51) Int. Cl.
*F16L 17/073* (2006.01)
*F16J 15/02* (2006.01)
*F16J 15/10* (2006.01)
*F16L 17/035* (2006.01)

(56) References Cited

U.S. PATENT DOCUMENTS

| | | | | |
|---|---|---|---|---|
| 2,345,515 A * | 3/1944 | Tweedale | | F16L 17/073 |
| | | | | 210/450 |
| 2,366,161 A * | 1/1945 | Tweedale | | F16L 17/073 |
| | | | | 267/1.5 |
| 2,815,973 A * | 12/1957 | Jackson | | F16J 15/166 |
| | | | | 277/572 |
| 3,114,561 A * | 12/1963 | Creath | | F16J 15/121 |
| | | | | 277/555 |
| 3,218,087 A | 11/1965 | Hallesy | | |
| 3,302,953 A * | 2/1967 | Glasgow | | F16J 15/127 |
| | | | | 277/611 |
| 3,357,693 A * | 12/1967 | Perry | | F16J 15/3456 |
| | | | | 267/1.5 |
| 3,647,227 A | 3/1972 | Lojkutz et al. | | |
| 3,698,728 A * | 10/1972 | Walker | | F16J 15/104 |
| | | | | 277/612 |
| 3,715,134 A * | 2/1973 | Faccou | | F16L 27/0828 |
| | | | | 277/363 |
| 3,720,420 A * | 3/1973 | Jelinek | | F16J 15/104 |
| | | | | 277/611 |
| 3,871,668 A * | 3/1975 | Coker | | F16J 15/127 |
| | | | | 277/643 |
| 3,970,321 A * | 7/1976 | Dechavanne | | F16J 15/3208 |
| | | | | 277/556 |
| 4,053,163 A * | 10/1977 | Vegella | | F16J 15/20 |
| | | | | 277/530 |
| 4,133,542 A * | 1/1979 | Janian | | F16J 15/3212 |
| | | | | 277/555 |
| 4,204,716 A * | 5/1980 | Baylor | | F16J 15/3456 |
| | | | | 277/362 |
| 4,268,045 A * | 5/1981 | Traub | | F16F 9/363 |
| | | | | 277/589 |
| 4,346,647 A * | 8/1982 | Weaver | | F16J 15/166 |
| | | | | 277/434 |
| 4,570,944 A * | 2/1986 | Traub | | F16J 15/56 |
| | | | | 277/572 |
| 4,576,386 A * | 3/1986 | Benson | | F16J 15/166 |
| | | | | 277/584 |
| 4,592,558 A | 6/1986 | Hopkins | | |
| 4,618,154 A * | 10/1986 | Freudenthal | | F16J 15/3236 |
| | | | | 277/530 |
| 4,635,945 A * | 1/1987 | Beck | | F16J 15/166 |
| | | | | 277/530 |
| 4,655,462 A | 4/1987 | Balsells | | |
| 4,658,847 A * | 4/1987 | McCrone | | E06B 5/164 |
| | | | | 137/72 |
| 4,730,835 A * | 3/1988 | Wilcox | | F16J 15/166 |
| | | | | 166/120 |
| 5,171,025 A * | 12/1992 | Stoll | | F16J 15/3252 |
| | | | | 137/248 |
| 5,211,226 A * | 5/1993 | Hendrickson | | E21B 17/06 |
| | | | | 166/118 |
| 5,306,021 A * | 4/1994 | Morvant | | F16J 15/3232 |
| | | | | 277/530 |
| 5,480,163 A * | 1/1996 | Miser | | F16J 15/3236 |
| | | | | 277/437 |
| 5,518,257 A * | 5/1996 | Breaker | | F16J 15/127 |
| | | | | 277/612 |
| 5,551,703 A * | 9/1996 | Morvant | | F16J 15/3232 |
| | | | | 277/584 |
| 5,630,591 A * | 5/1997 | Drijver | | F16J 15/025 |
| | | | | 277/553 |
| 5,700,013 A | 12/1997 | Baty | | |
| 5,799,953 A * | 9/1998 | Henderson | | F16J 15/3236 |
| | | | | 277/554 |
| 5,879,010 A * | 3/1999 | Nilkanth | | E21B 33/1216 |
| | | | | 277/545 |
| 5,979,904 A * | 11/1999 | Balsells | | F16J 15/3236 |
| | | | | 277/554 |
| 6,386,545 B1 * | 5/2002 | Evans | | F16J 13/02 |
| | | | | 277/336 |
| 6,962,347 B2 * | 11/2005 | Smith, III | | E21B 17/02 |
| | | | | 137/614.04 |
| 7,562,878 B2 * | 7/2009 | Dietle | | F16J 15/3208 |
| | | | | 277/559 |
| 7,604,243 B2 * | 10/2009 | Zitting | | F16J 15/3236 |
| | | | | 277/584 |
| 7,637,508 B2 * | 12/2009 | Montipo | | F16J 15/3236 |
| | | | | 277/500 |
| 8,312,805 B1 * | 11/2012 | Blume | | F04B 53/143 |
| | | | | 277/560 |
| 9,016,693 B1 * | 4/2015 | Shek | | F04B 1/0448 |
| | | | | 277/500 |
| 9,109,703 B2 * | 8/2015 | Dietle | | F16J 15/166 |
| 9,267,606 B2 * | 2/2016 | Haland | | F16K 5/0678 |
| 9,273,695 B2 * | 3/2016 | Huth | | F04D 29/083 |
| 2002/0153664 A1 | 10/2002 | Schroeder | | |
| 2004/0160018 A1 * | 8/2004 | Dupont | | F16J 15/062 |
| | | | | 277/628 |
| 2005/0093246 A1 | 5/2005 | Dietle et al. | | |
| 2006/0066058 A1 | 3/2006 | Holt et al. | | |
| 2007/0040335 A1 * | 2/2007 | Kowalczyk | | F16J 15/445 |
| | | | | 277/412 |
| 2007/0045967 A1 * | 3/2007 | Park | | F16J 15/104 |
| | | | | 277/534 |
| 2008/0136112 A1 * | 6/2008 | Addis | | F16J 15/3288 |
| | | | | 277/355 |
| 2008/0197578 A1 * | 8/2008 | Osborne | | F16J 15/025 |
| | | | | 277/590 |
| 2009/0146379 A1 * | 6/2009 | Foster | | F16J 15/3236 |
| | | | | 277/307 |
| 2010/0013220 A1 * | 1/2010 | Rao | | F16J 15/104 |
| | | | | 285/368 |
| 2010/0084824 A1 | 4/2010 | Horiba et al. | | |
| 2010/0090460 A1 * | 4/2010 | Vitel | | F16L 17/035 |
| | | | | 285/306 |
| 2013/0161553 A1 * | 6/2013 | Hunter | | F16K 39/04 |
| | | | | 251/366 |

FOREIGN PATENT DOCUMENTS

| | | | | |
|---|---|---|---|---|
| GB | 1287501 A | * | 8/1972 | F16J 15/104 |
| JP | H07-10683 U | | 2/1995 | |
| JP | H07-25311 U | | 5/1995 | |
| JP | 3052890 U | | 7/1998 | |
| JP | 2005-83414 A | | 3/2005 | |
| JP | 2011-179629 A | | 9/2011 | |

OTHER PUBLICATIONS

Office Action on corresponding foreign application (JP Application No. 2014-086697) from the Japanese Patent Office dated Sep. 19, 2017.

* cited by examiner

INTERLOCKING FACE SEAL ASSEMBLIES AND RELATED METHODS

FIELD OF THE ART

The present disclosure pertains to face seals and related methods and more particularly to spring energized face seals with backing rings.

BACKGROUND

Spring energized lip seals may comprise a sealing element and a rigid backup ring or support ring to provide support for the sealing element or resistance against extrusion of the sealing element. However, the sealing element for the lip seal is typically placed adjacent the backup and the two do not engage since the orientation of the seal lip is to seal against a dynamic surface. Thus, in many such seal assemblies, the sealing element and the backup ring or support ring is not mechanically attached and separation between the components may occur during use or assembly.

SUMMARY

The present systems, devices, and methods offer a means to assemble the sealing element and the backup ring or support ring of a spring energized face seal assembly together in order to achieve a one-piece face seal assembly or interlocking face seal assembly.

Aspects of the present disclosure include a method for assembling an interlocking face seal assembly. The method comprises: forming a sealing element with a convex outer surface and having a spring located in a spring cavity defined by two sealing flanges and a center channel section; forming a backup ring with an inner surface defining a bore, said inner surface comprising a concave inner surface; assembling the sealing element into the bore of the backup ring such that the concave inner surface accepts at least a portion of the convex outer surface of the sealing element and the sealing element is retained within the backup ring; and wherein the spring is biased against an inside surface of each of the two sealing flanges.

The method wherein the convex outer surface of the sealing element can comprise two tapered surfaces with an apex therebetween.

The method wherein the convex outer surface of the sealing element can comprise two tapered surfaces and a flat surface therebetween.

The method wherein the backup ring can comprise a first backing ring part attached to a second backing ring part.

The method wherein the first backing ring part can be threaded to the second backing ring part.

The method wherein the two sealing flanges can seal against two stationary planar surfaces of an equipment housing that are generally parallel to one another.

The method wherein the spring can be a canted coil spring, a V-spring, or a ribbon spring.

The method wherein the two sealing flanges can define a width that is larger a width of the backing ring so that the when the interlocking face seal assembly is installed in an equipment housing, the two sealing flanges are compressed by two stationary surfaces before the backing ring is compressed by the two stationary surfaces.

A further feature of the present disclosure is an interlocking face seal assembly comprising: a sealing element with a convex outer surface or a concave outer surface and having a spring located in a spring cavity defined by two sealing flanges and a center channel section. The seal assembly can further include a backup ring with an inner surface defining a bore, said inner surface comprising a convex inner surface or a concave inner surface; and whereby the concave inner surface of the backup ring accepts at least a portion of the convex outer surface of the sealing element or the convex inner surface of the backup ring accepts at least a portion of the concave outer surface of the sealing element and the sealing element is retained within the backup ring.

The interlocking face seal wherein an outermost diameter of the sealing element can be larger than an innermost diameter of backup ring.

The interlocking face seal wherein an outermost diameter of the backup ring can be larger than an innermost diameter of sealing element.

The interlocking face seal assembly whereby radial deflection of the sealing element or backup ring can occur for assembly.

The interlocking face seal assembly whereby the concave surface can comprise a radiused, tapered, or chamfered edge.

The interlocking face seal assembly wherein the spring can be a canted coil spring, a V-spring, or a ribbon spring.

The interlocking face seal assembly wherein the backup ring can comprise a first backing ring part attached to a second backing ring part.

A yet further feature of the present disclosure is a method for assembling an interlocking face seal assembly comprising: forming a spring energized sealing element with a convex outer surface; forming a backup or support ring with a concave inner surface; assembling the sealing element into the inner bore of the backup or support ring such that the concave inner surface accepts a portion of the convex outer surface and the sealing element is retained within the backup or support ring.

Yet another feature of the present disclosure is a method for assembling an interlocking face seal assembly comprising: forming a spring energized sealing element with a concave outer surface; forming a backup or support ring with a convex inner surface; assembling the sealing element into the inner bore of the backup or support ring such that the concave outer surface accepts a portion of the convex inner surface and the sealing element is retained within the backup or support ring.

A still yet further feature of the present disclosure is a method for assembling an interlocking face seal assembly comprising: forming a spring energized sealing element with a convex inner surface; forming a backup or support ring with a concave outer surface; assembling the backup or support ring into the inner bore of the sealing element such that the concave outer surface accepts a portion of the convex inner surface and the backup or support ring is retained within the sealing element.

A still yet further feature of the present disclosure is a method for assembling an interlocking face seal assembly comprising: forming a spring energized sealing element with a concave inner surface; forming a backup or support ring with a convex outer surface; assembling the backup or support ring into the inner bore of the sealing element such that the concave inner surface accepts a portion of the convex outer surface and the backup or support ring is retained within the sealing element.

The method whereby the sealing element and backup ring can be formed such that the outermost diameter of the sealing element is larger than the innermost diameter of backup or support ring.

The method whereby the sealing element and backup ring can be formed such that the outermost diameter of the backup or support ring is larger than the innermost diameter of sealing element.

The method whereby radial deflection of the sealing element or backup or support ring can be required for assembly.

The method whereby the concave surface can include a radiused, tapered, or chamfered edge.

The present disclosure is also directed to face seal assemblies. An interlocking face seal assembly is provided comprising: a spring energized sealing element with a convex outer surface; a backup or support ring with a concave inner surface; whereby the concave inner surface accepts a portion of the convex outer surface and the sealing element is retained within the backup or support ring.

Another interlocking face seal assembly is provided comprising: a spring energized sealing element with a concave outer surface; a backup or support ring with a convex inner surface; whereby the concave outer surface accepts a portion of the convex inner surface and the sealing element is retained within the backup or support ring.

Another feature of the present disclosure is an interlocking face seal assembly comprising: a spring energized sealing element with a convex inner surface; a backup or support ring with a concave outer surface; whereby the concave outer surface accepts a portion of the convex inner surface and the backup or support ring is retained within the sealing element.

A still further assembly of the present disclosure includes an interlocking face seal assembly comprising: a spring energized sealing element with a concave inner surface; a backup or support ring with a convex outer surface; whereby the concave inner surface accepts a portion of the convex outer surface and the backup or support ring is retained within the sealing element.

The interlocking face seal assembly whereby the outermost diameter of the sealing element can be larger than the innermost diameter of backup or support ring.

The interlocking face seal assembly whereby the outermost diameter of the backup or support ring can be larger than the innermost diameter of sealing element.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of spring energized face seals or spring energized face seal assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
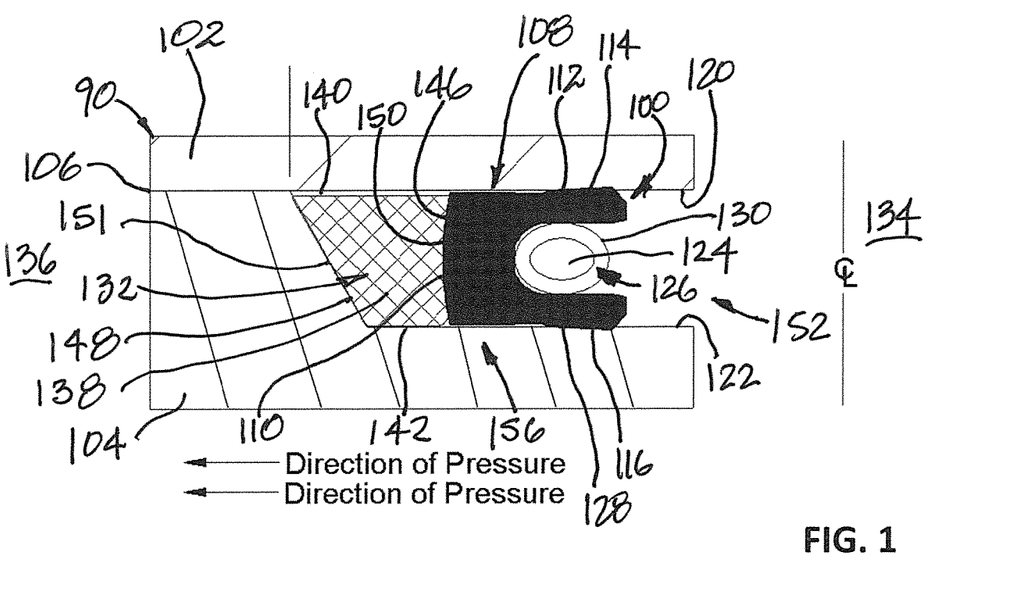
FIG. 1 is a schematic partial cross-sectional side view of a supported face seal assembly mounted in a groove of an equipment housing in accordance with a first embodiment.

With reference now to FIG. 1, a schematic partial cross-sectional side view of a spring energized face seal or face seal assembly 100 is shown located between two stationary components 102, 104 for sealing a seam 106 between the two components from fluid or gas that may leak through the seam. The two stationary components 102, 104 may be part of an equipment housing, a gland, or embody two flanges of a piping system. The housing that the spring energized face seal 100 is positioned in may generally be referred to herein as an equipment housing 90 and may represent any structure where a seam between two planar surfaces is to be sealed. The face seal assembly 100 is annular in configuration with only a part of a cross-section of the seal assembly shown. The centerline ℄ designates the seal assembly 100 centerline and the seal assembly 100 is understood to have a mirror image on the other side of the centerline. The seal assembly centerline ℄ can also and often be the centerline of the equipment housing 90 that the seal assembly 100 is used in for sealing a seam.

As shown, the seal assembly 100 has a sealing element 108 comprising a center channel section 110, a first flange 112 comprising a first seal lip 114, and a second flange 116 comprising a second seal lip 118 for sealing against a first stationary surface 120 and a second stationary surface 122, respectively. The sealing element 108 may be made from materials such as polytetrafluoroethylene (PTFE), a thermoplastic elastomer (TPE) or an elastomer. Both stationary surfaces 120, 122 have generally planar surfaces that are not formed as part of an arc. Thus, the planar surfaces that the face seal assemblies of the present disclosure are configured to seal are distinguished from surfaces formed on a round body, such as a pin, a rod, or a shaft. Also, the terms "first" and "second" are meant to distinguish two different components only and not meant to be structurally limiting. For example, the shape and curvatures of the first and second sealing lips 116, 118 may be exactly the same notwithstanding their designations with the terms "first" and "second". Thus, unless the context indicates otherwise, the terms "first" and "second" are not structurally limiting.

The center channel section 110 and the two flanges 112, 116 define a spring holding space 124 having a canted coil spring 126 located therein, which is also understood to be an annular or garter-type configuration having a spring centerline. In the example shown, the canted coil spring is a radial canted coil spring. As is well known in the relevant art, the canted coil spring 126 has a plurality of coils 130 canted generally along the same direction and each comprises a major axis and a minor axis, which is the shorter of two axes. As shown, the canted coil spring 126 is arranged so that the plurality of coils 130 bias against the inside surfaces of the first flange 112 and the second flange 116 to press the first sealing lip 114 and the second sealing lip 118 against the first stationary surface 120 and the second stationary surface 122, respectively, to seal the seam 106 between the two first stationary component and the second stationary component. In other examples, the spring is a V-spring or a ribbon spring instead of a canted coil spring. V-spring and ribbons can also touch and bias against the first and second sealing flanges 112, 116.

A backup ring or backing ring 132 is provided for supporting the sealing element 108 from the high pressure source 134, which in the present embodiment is in the vicinity of the centerline ℄. Thus, in one example, a sealing element 108 comprises a first sealing flange 112 and a second sealing flange 116 for sealing against two generally parallel planar surfaces 120, 122 and wherein the two flanges have sealing lips 114, 118 that point in the direction of the high pressure source 134. The backup ring 132 is provided to support the sealing element 108 from being extruded in the direction from the high pressure region 134 to the low pressure region 136. The backup ring 132 is made from a harder material than the material for the sealing element, such as from a metal or a rigid plastic. In one example, the plastic is an engineered plastic such as acrylonitrile butadiene styrene (ABS), polyetheretherketone (PEEK), or polycarbonate (PC), to name a few non-limiting examples. Metal materials usable as a backup ring can include steel, stainless steel, iron, chrome-base and nickel-base metals, to name a few non-limiting examples.

The backup ring 132 is shown with a ring body 138 having a solid core. The body 138 has a first side surface 140, a second side surface 142, a support surface 146, and an remote surface 148 away from the sealing element. Because the backup ring 132 is annular in shape, e.g., a ring, the support surface 146 defines a bore on the backup ring 132 for receiving the sealing element 108. The arrangement in which one component fits into a bore of another may herein be referred to as a telescoping arrangement. The support surface 146 is configured to directly contact and support the exterior surface 150 of the center channel section 110 of the sealing element 108. For example, the sealing element 108 and the spring 126 may be compressed and/or manipulated to fit within the bore of the backup ring 132 and then allowed to expand so that the exterior surface 150 of the sealing element 108 rests against be supported the support surface 146 of the backing ring 132. The remote surface 148 of the backing ring 132 is configured to mate or press against the equipment housing 90. The contour of the remote surface 148 may embody any corresponding surface that matches the contour of the back wall 151 of the groove 152 that receives the face seal 100.

The support surface 146 of the backing ring 132 is shown comprising a generally concave contour. In one example, the support surface 146 has a contour that matches the contour of the exterior surface 150 of the center channel section 110. As shown, the concave contour support surface 146 supports the matching convex surface 150 of the center channel section 110 of the sealing element. However, the support surface 146 may have a slightly different contour than the exterior surface 150 to shape the direction or manner of compression of the sealing element against the backing ring 132. As shown, the sealing element 108 comprises a convex exterior surface 150 that is received by the concave support surface 146 of the backing ring. The matching contours of the two surfaces 146, 150 and the ring configuration with a bore achieve a mechanical engagement that retains the sealing element 108 within the backup ring 132. For example, after the sealing element 108 is placed inside the bore of the backing ring 132 to form a supported face seal assembly 156, the mating surfaces 146, 150 between the two components form a mechanical engagement that prevents the sealing element 108 from popping or falling out from the bore of the backup ring 132. This allows the supported face seal assembly 156 to be installed in the equipment housing 90 with minimal risk that the assembly 156 may separate during installation or service. As the supported face seal assembly 156 has mechanical engagement between the sealing element and the backing ring, the seal assembly may alternatively be referred to as an interlocking face seal assembly.

As used herein, the term concave is understood to mean an outline or surface that curves inward. The curved surface can be smooth or formed from a combination of straight edges and/or curved segments so long as the overall outline has an inward contour.

As used herein, the term convex is understood to mean an outline or surface that curves outward. The curved surface can be smooth or formed from a combination of straight edges and/or curved segments so long as the overall outline has an outward contour.

In one example, the width or measurement between the first sealing lip 114 and the second sealing lip 118 is larger than the width or measurement between the first side surface 140 and the second side surface 142 of the backing ring 132. Therefore, some radial deflection of the sealing element 108 and/or backup ring 132 must occur during installation of the supported face seal assembly 156 into the groove 152 of the equipment housing. Furthermore the concave feature 146 of the backup ring 132 may comprise a radiused corner on an inner edge in order to facilitate assembly and help guide the heel of the convex surface 150 sealing element into the inner bore of the backup ring, as further discussed below with reference to some of the alternative embodiments.

Installation of the supported face seal assembly 156 can first comprise prepping the equipment housing 90. As shown, the first stationary structure 102 may be removed or separated from the second stationary structure 104 to expose the groove 152. The supported face seal assembly 156 is then lowered into the open groove 152 and then the first stationary surface 102 re-installed and attached to the second stationary surface 104. In an alternative embodiment, the backing ring 132 is first installed into the open groove 152 without the sealing element 108. After the backing ring 132 is installed in the open groove, the sealing element 108 is then manipulated and installed inside the bore of the backing ring 132. The canted coil spring 126 may be installed at the same time with the sealing element 108 or may be installed into the spring holding space 124 after the sealing element 108 is placed into the bore of the backing ring 132. The gap between the first stationary surface 124 and the second stationary surface 122 is slightly smaller than the width measured at the first and second sealing lips 114, 118 to ensure adequate squeeze or compression on the two sealing flanges 112, 116. The gap between the first stationary surface 124 and the second stationary surface 122 should be the same or slightly larger, such as two thousandths to about 20 thousandths of an inch, than the width of the backing ring 132 measured between the first side surface 140 and the second side surface 142. This will ensure a compression fit against the sealing element 108 but not against the backing ring. However, the closer the tolerance between the width of the backing ring 132 and the two stationary components 102, 104 wherein the backing ring seats, the smaller is the potential extrusion gap that the sealing element can be pushed through by the high pressure source 134. Thus, the clearance or compression between the backing ring and the two stationary components may be selected as appropriate depending on the particular application.

As describe, an aspect of the present device, system, and method is understood to include a supported face seal assembly comprising an annular sealing element comprising a centerline, two sealing flanges pointed in the direction of the centerline, and a center channel section mounted in a bore of a backing ring. In one example, the backing ring comprises body comprising a support surface defining the bore for receiving the sealing element and wherein the support surface has a concave surface. The supported face seal assembly wherein the center channel section of the sealing element comprises an exterior surface comprising a convex surface that closely contacts the concave support surface of the backing ring. In one application, the supported face seal assembly is positioned in a groove of an equipment housing such that the sealing element is oriented towards the pressure source and the backing ring is oriented further away from the pressure source. The backing ring and the sealing element are mechanically engaged and the backing ring supports the sealing element from high pressure extrusion through a seam in the equipment housing.

A further aspect of the present disclosure is a method for manufacturing a supported face seal assembly comprising forming a sealing element comprising a center channel section located between a first seal flange and a second seal flange. The method can further comprise placing a canted coil spring in a spring holding space defined by the center channel section and the two sealing flanges. The method can further comprise placing the sealing element with the canted coil spring into a bore of a backing ring and aligning a convex surface on the sealing element against a concave surface on the backing ring. The method can further include manufacturing curvatures, features, and structures discussed and shown with reference to FIG. 1. The method can further comprise using the supported face seal assembly. The method can comprise the steps of placing the supported face seal assembly into a groove of an equipment housing and aligning the supported face seal assembly so that the two sealing flanges point in the direction of the high pressure source. In alternative embodiments, the backing ring has a convex surface and the sealing element has a concave surface.

For other face seal assemblies, supported face seal assemblies, and seal assembly components disclosed herein below, such as for other supporting components or other sealing elements, it is understood that where a feature is shown in the subsequent drawings but not expressly described and is otherwise the same or similar to the feature or features described elsewhere, such as above with reference to the supported face seal assembly of FIG. 1, the disclosed part or parts shown in the subsequent drawing figures but not expressly described, because of redundancy or because knowledge is understood to be built on a foundation laid out by the earlier disclosures, may nonetheless be understood to be described or taught by the same or similar features expressly set forth herein in which the feature or features have been described Said differently, subsequent disclosures of the present application are built upon the foundation of earlier disclosures and incorporate the teachings of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments unless the context indicates otherwise.

Figure 2:
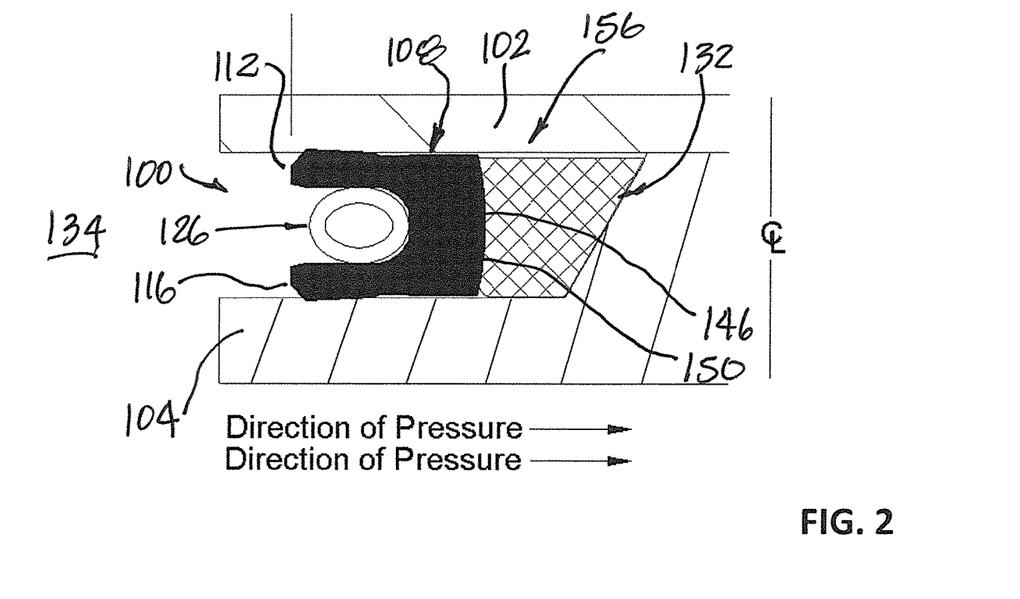
FIG. 2 is a schematic partial cross-sectional side view of a supported face seal assembly mounted in a groove of an equipment housing in accordance with a second embodiment.

FIG. 2 shows a cross-sectional side view of a supported face seal assembly 156 provided in accordance with alternative aspects of the present disclosure. Like the assembly of FIG. 1, the present supported face seal assembly comprises a sealing element 108 and a backing ring 132. However, the orientation and the arrangement of the two components of the present embodiment have been modified. As shown, the supported face seal assembly 156 is an external supported face seal in that the backing ring 132 forms a ring having a support surface 146 and the sealing element 108 is placed around the outside diameter of the backing ring 132. The two flanges 112, 116 on the sealing element point towards the pressure source 134, which is away from the centerline $\mathcal{C}_L$. Said differently, the sealing element 108 defines a bore having the backing ring 132 located therein. The backing ring has a support surface 146 that is contoured to mate with an exterior contour surface 150 of the sealing element 108. The supported face seal assembly 156 may be used where the pressure source is higher on the side away from the centerline $\mathcal{C}_L$. For example, in a vacuum application, the outside atmosphere 134 can have a higher pressure than the vacuum region near or at the centerline $\mathcal{C}_L$.

Thus, as shown, the backup ring 132 comprises a concave support surface 146 and the sealing element 108 comprises a convex exterior surface 150 such that the concave surface may accept the convex surface to achieve a mechanical engagement that retains the sealing element 108 to the backup ring 132. In other examples, the backing ring 132 has a convex support surface 146 and the sealing element has a concave exterior surface 150 that mesh or mate.

Analogous methods of making and of using the supported face seal assembly of FIG. 2 are understood to be encompassed herein.

Figure 3:
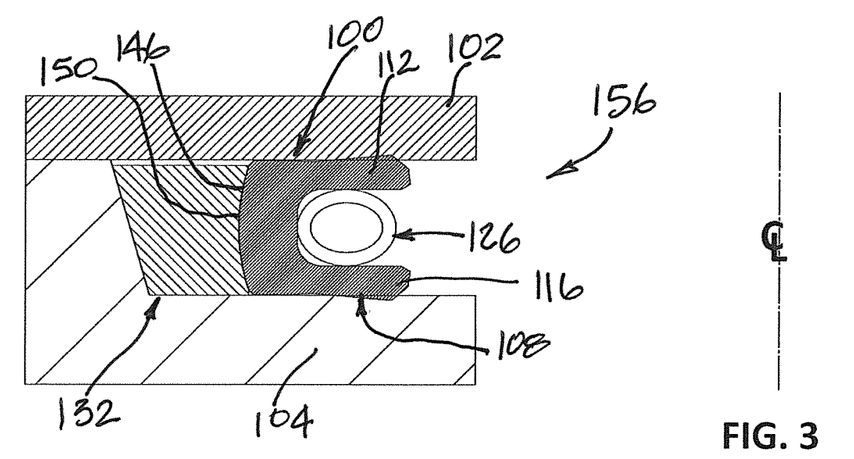
FIG. 3 is a schematic partial cross-sectional side view of a supported face seal assembly mounted in a groove of an equipment housing in accordance with a third embodiment.

FIG. 3 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIG. 1. However, the concave support surface 146 of the backing ring 132 and the convex exterior surface 150 of the sealing element 108 are more curved or contoured than comparable surfaces on the FIG. 1 assembly. This will allow for a greater mechanical engagement compared to the more planar or less curved surfaces incorporated in the assembly of FIG. 1. This will in turn provide a more secured assembly with greater mechanical engagement and lower likelihood for separation between the backing ring 132 and the sealing element 108. In still other embodiments, the support surface 146 and the exterior surface 150 are more planar and less curved to simplify placement of the sealing element into the bore of the backing ring. For example, when the mating surfaces 146, 150 are more planar, less interference is provided by the mechanical engagement and therefore the two components are easier to install.

In an alternative embodiment, the supported face seal assembly 156 of FIG. 3 may be reversed and configured as a supported external face seal assembly, similar to the supported face seal assembly of FIG. 2. However, the support surface 146 and the exterior surface 150 of the alternative embodiment of FIG. 3 are contoured with similar but reversed orientation from that of FIG. 3.

Analogous methods of making and of using the supported face seal assembly of FIG. 3 are understood to be encompassed herein.

Figure 4:
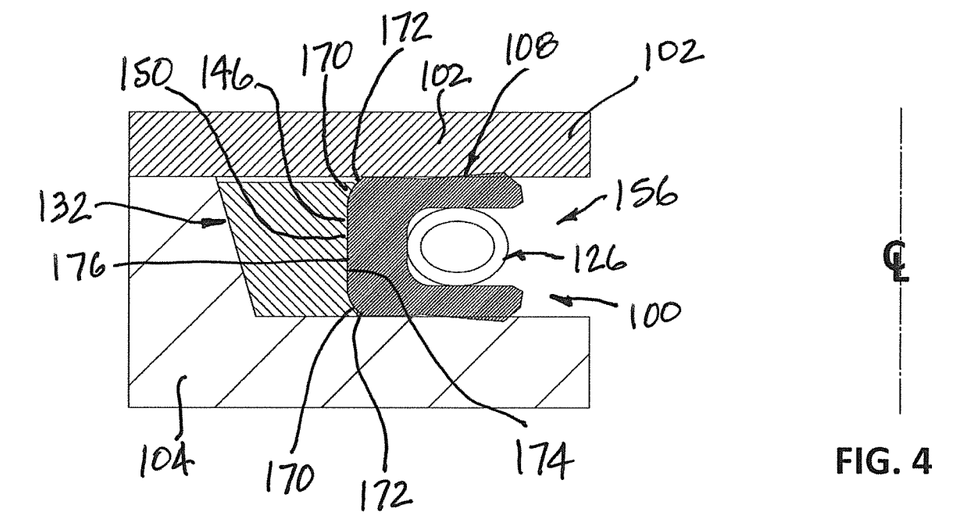
FIG. 4 is a schematic partial cross-sectional side view of a supported face seal assembly mounted in a groove of an equipment housing in accordance with a fourth embodiment.

FIG. 4 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3. However, the concave support surface 146 of the backing ring 132 and the convex exterior surface 150 of the sealing element 108 are provided with radiused corners 170 on an inner edge of the backing ring in order to facilitate assembly and help guide the heels 172 of the convex surface 150 of the sealing element 108 into the inner bore of the backup ring 132. This will allow for a high degree of mechanical engagement while facilitating assembly. As shown, the center section 174 of the exterior surface 150 and the center section 176 of the support surface 146 are generally flat or straight relative to the centerline ₵. However, the radiused corners 170 will ensure adequate mechanical engagement to retain the sealing element 108 within the bore of the backing ring 132 in spite of the generally flat center sections.

In an alternative embodiment, the supported face seal assembly 156 of FIG. 4 may be reversed and configured as a supported external face seal assembly, similar to the supported face seal assembly of FIG. 2. However, the support surface 146 and the exterior surface 150 of the alternative embodiment of FIG. 4 are contoured with similar but reversed orientation from that of FIG. 4.

Analogous methods of making and of using the supported face seal assembly of FIG. 4 are understood to be encompassed herein.

Figure 5:
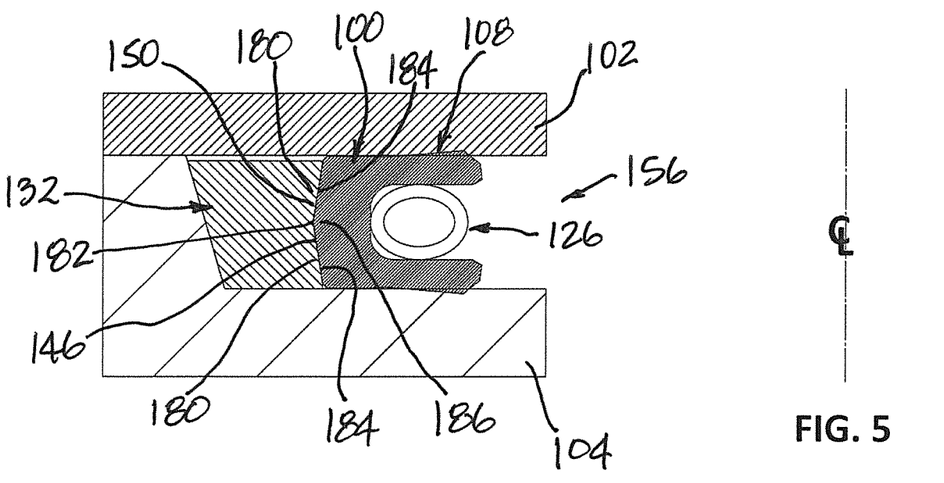
FIG. 5 is a schematic partial cross-sectional side view of a supported face seal assembly mounted in a groove of an equipment housing in accordance with a fifth embodiment.

FIG. 5 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-4. However, the concave support surface 146 of the backing ring 132 and the convex exterior surface 150 of the sealing element 108 have been modified. In the present embodiment, the support surface 146 is provided with two tapered walls 180 having an apex 182 therebetween to mate or match the two tapered walls 184 and apex 186 of the exterior surface 150 on the sealing element 108. This will allow for a high degree of mechanical engagement while facilitating assembly. Radiused corners 170 on an inner edge of the backing ring 132 may be provided along with tapered heels 172 of the convex surface 150 of the sealing element 108.

In an alternative embodiment, the supported face seal assembly 156 of FIG. 5 may be reversed and configured as a supported external face seal assembly, similar to the supported face seal assembly of FIG. 2. However, the support surface 146 and the exterior surface 150 of the alternative embodiment of FIG. 5 are contoured with similar but reversed orientation from that of FIG. 5. Analogous methods of making and of using the supported face seal assembly of FIG. 5 are understood to be encompassed herein.

Figure 6:
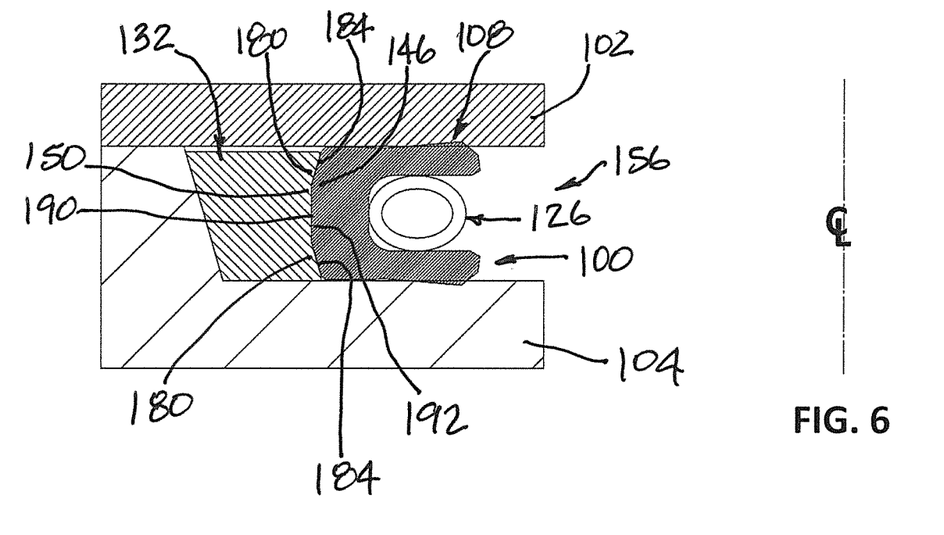
FIG. 6 is a schematic partial cross-sectional side view of a supported face seal assembly mounted in a groove of an equipment housing in accordance with a sixth embodiment.

FIG. 6 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-5. However, the concave support surface 146 of the backing ring 132 and the convex exterior surface 150 of the sealing element 108 have been modified. In the present embodiment, the support surface 146 is provided with two tapered walls 180 subtended by a generally flat surface 190 therebetween to mate or match the two tapered walls 184 and flat surface 192 of the exterior surface 150 on the sealing element 108. The two flat surfaces 190, 192 are flat relative to the centerline ₵. This will allow for a high degree of mechanical engagement while facilitating assembly. Radiused corners 170 on an inner edge of the backing ring 132 may be provided along with tapered heels 172 of the convex surface 150 of the sealing element 108.

In an alternative embodiment, the supported face seal assembly 156 of FIG. 6 may be reversed and configured as a supported external face seal assembly, similar to the supported face seal assembly of FIG. 2. However, the support surface 146 and the exterior surface 150 of the alternative embodiment of FIG. 6 are contoured with similar but reversed orientation from that of FIG. 6.

Analogous methods of making and of using the supported face seal assembly of FIG. 6 are understood to be encompassed herein.

Figure 7:
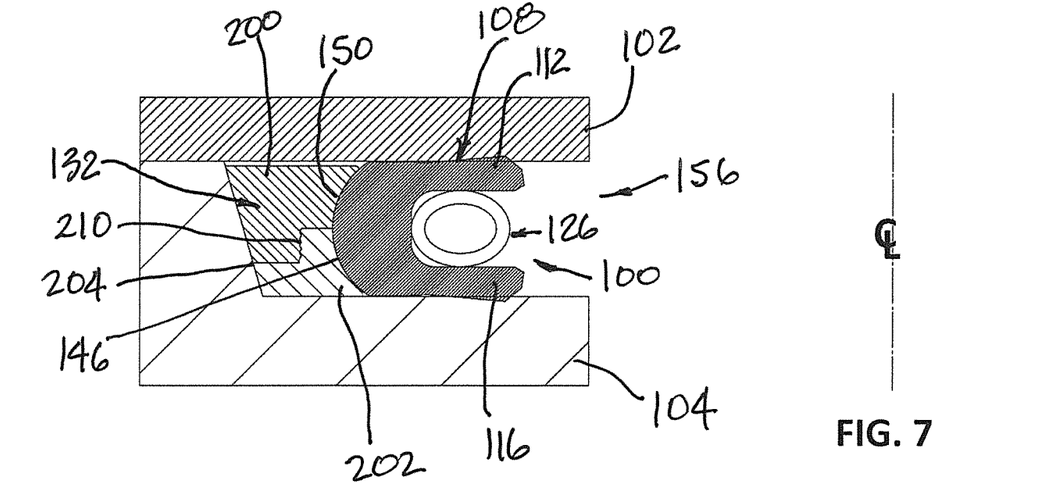
FIG. 7 is a schematic partial cross-sectional side view of a supported face seal assembly mounted in a groove of an equipment housing in accordance with a seventh embodiment.

FIG. 7 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-5 with greater similarity to the FIG. 3 embodiment. Thus, the support surface 146 on the backing ring 132 supports a similarly contoured exterior surface 150 on the sealing element 108. However, in the present embodiment, the backing ring 132 is provided as a two-part backing ring comprising a first backing ring part 200 and a second backing ring part 202, which join one another along a seam 204. As shown, the seam 204 is generally zig-zag or "Z" shape. The two-piece backing ring configuration facilitates assembly especially where the contoured concave and convex surfaces 146, 150 are such that assembly may be difficult. In other words, there may be instances in which it is difficult to distort the sealing element 108 a sufficient amount to place it and the canted coil spring into the bore of the backing ring 132. With the two piece backing ring design of the present embodiment, the two pieces 200, 202 can be separated and pushed together around the sealing element 108 to facilitate assembly. In some examples, the two backing ring pieces 200, 202 are joined to one another by threads. As shown, the first piece 200 has a threaded bore for receiving the threaded stem from the second piece 202.

In an alternative embodiment, the supported face seal assembly 156 of FIG. 7 may be reversed and configured as a supported external face seal assembly, similar to the supported face seal assembly of FIG. 2. However, the support surface 146 and the exterior surface 150 of the alternative embodiment of FIG. 7 are contoured with similar but reversed orientation from that of FIG. 7.

Analogous methods of making and of using the supported face seal assembly of FIG. 7 are understood to be encompassed herein.

Figure 8:
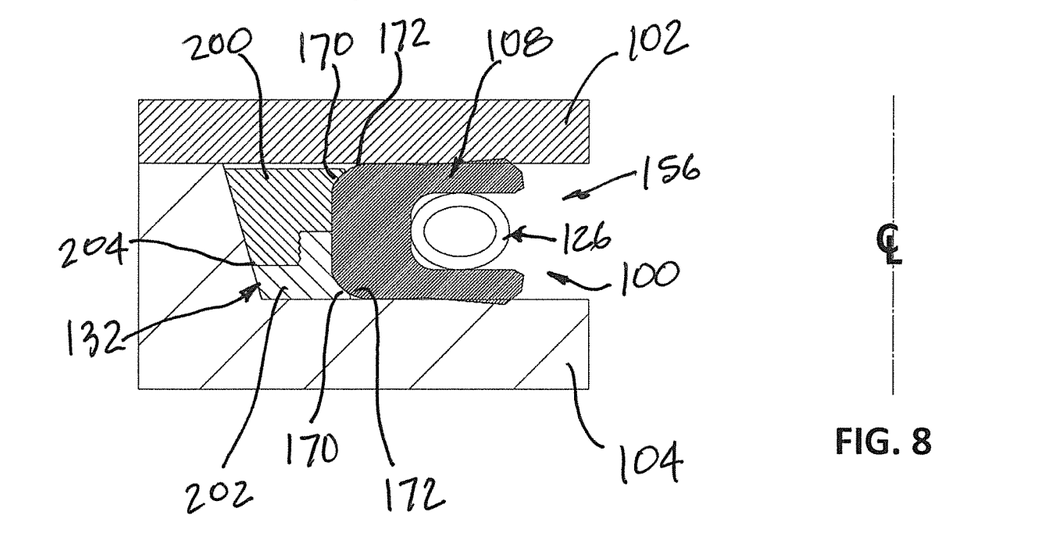
FIG. 8 is a schematic partial cross-sectional side view of a supported face seal assembly mounted in a groove of an equipment housing in accordance with an eight embodiment.

FIG. 8 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-5 with greater similarity to the FIG. 4 embodiment. Thus, the support surface 146 on the backing ring 132 supports a similarly contoured exterior surface 150 on the sealing element 108, which have radiused corners 170 to fit with tapered heels 172 as previously discussed with reference to FIG. 4. However, in the present embodiment, the backing ring 132 is provided as a two-part backing ring comprising a first backing ring part 200 and a second backing ring part 202, which join one another along a seam 204. As shown, the seam 204 is generally zig-zag or "Z" shape. The two-piece backing ring configuration facilitates assembly especially where the contoured concave and convex surfaces 146, 150 are such that assembly may be difficult. In other words, it may be difficult to distort the sealing element 108 a sufficient amount to place it into the bore of the backing ring 132. With the two piece backing ring design, the two pieces 200, 202 can be separated and pushed together around the sealing element 108 to facilitate assembly. In some examples, the two backing ring pieces 200, 202 are joined to one another by threads. As shown, the first piece 200 has a threaded bore for receiving the threaded stem from the second piece 202.

In an alternative embodiment, the supported face seal assembly 156 of FIG. 8 may be reversed and configured as a supported external face seal assembly, similar to the supported face seal assembly of FIG. 2. However, the support surface 146 and the exterior surface 150 of the alternative embodiment of FIG. 8 are contoured with similar but reversed orientation from that of FIG. 8.

Analogous methods of making and of using the supported face seal assembly of FIG. 8 are understood to be encompassed herein.

Figure 9:
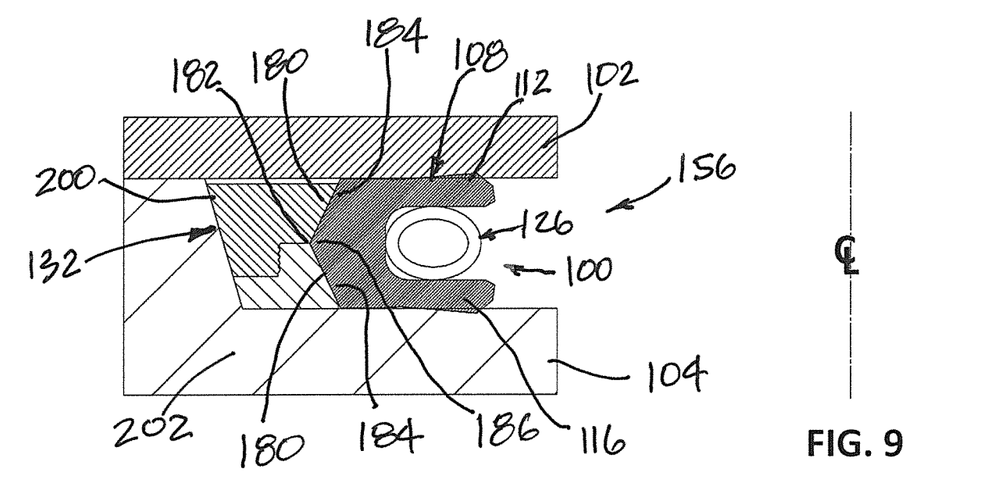
FIG. 9 is a schematic partial cross-sectional side view of a supported face seal assembly mounted in a groove of an equipment housing in accordance with a ninth embodiment.

FIG. 9 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-5 with greater similarity to the FIG. 5 embodiment. Thus, the support surface 146 on the backing ring 132 supports a similarly contoured exterior surface 150 on the sealing element 108, which have two slanted surfaces 180 and an apex 182 to fit, mate or match the two tapered walls 184 and apex 186 of the exterior surface 150 on the sealing element 108. However, in the present embodiment, the backing ring 132 is provided as a two-part backing ring comprising a first backing ring part 200 and a second backing ring part 202, which join to one another along a seam 204. As shown, the seam 204 is generally zig-zag or "Z" shape. The two-piece backing ring configuration facilitates assembly especially where the contoured concave and convex surfaces 146, 150 are such that assembly may be difficult. In other words, it may be difficult to distort the sealing element 108 a sufficient amount to place it into the bore of the backing ring 132. With the two piece backing ring design, the two pieces 200, 202 can be separated and pushed together around the sealing element 108 to facilitate assembly. In some examples, the two backing ring pieces 200, 202 are joined to one another by threads. As shown, the first piece 200 has a threaded bore for receiving the threaded stem from the second piece 202.

In an alternative embodiment, the supported face seal assembly 156 of FIG. 9 may be reversed and configured as a supported external face seal assembly, similar to the supported face seal assembly of FIG. 2. However, the support surface 146 and the exterior surface 150 of the alternative embodiment of FIG. 9 are contoured with similar but reversed orientation from that of FIG. 9.

Analogous methods of making and of using the supported face seal assembly of FIG. 9 are understood to be encompassed herein.

Figure 10:
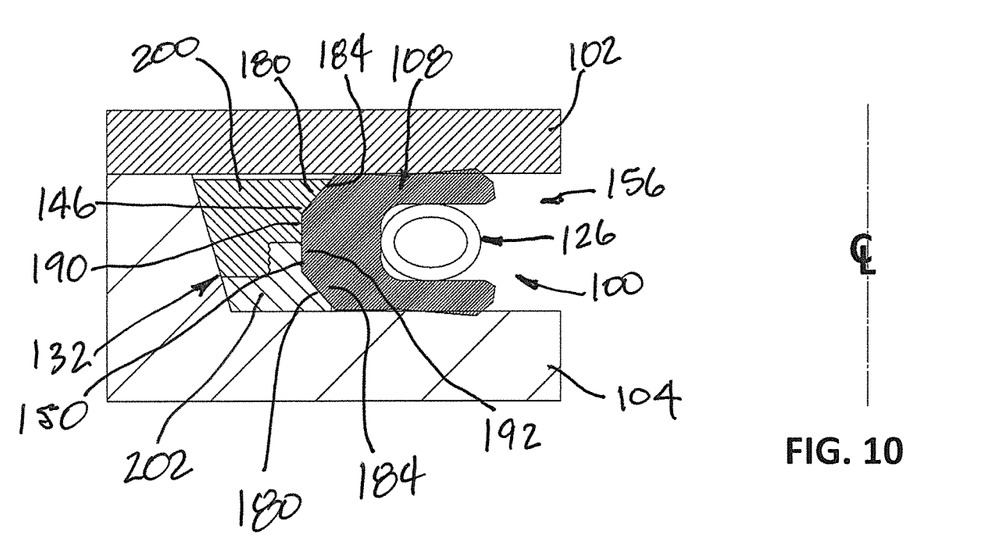
FIG. 10 is a schematic partial cross-sectional side view of a supported face seal assembly mounted in a groove of an equipment housing in accordance with a tenth embodiment.

FIG. 10 is a cross-sectional side view of yet another supported face seal assembly 156 provided in accordance with further alternative aspects of the present disclosure. As shown, the supported face seal assembly 156 comprises a face seal assembly 100 comprising a sealing element 108 having a canted coil spring 126 supported by a backing ring 132, similar to the supported face seal assembly 156 of FIGS. 1 and 3-5 with greater similarity to the FIG. 6 embodiment. Thus, the support surface 146 on the backing ring 132 supports a similarly contoured exterior surface 150 on the sealing element 108. In the present embodiment like the FIG. 6 embodiment, the support surface 146 is provided with two tapered walls 180 subtended by a generally flat surface 190 therebetween to mate or match the two tapered walls 184 and flat surface 192 of the exterior surface 150 on the sealing element 108. The two flat surfaces 190, 192 are flat relative to the centerline $C_L$. Further, in the present embodiment, the backing ring 132 is provided as a two-part backing ring comprising a first backing ring part 200 and a second backing ring part 202, which join to one another along a seam 204. As shown, the seam 204 is generally zig-zag or "Z" shape. The two-piece backing ring configuration facilitates assembly especially where the contoured concave and convex surfaces 146, 150 are such that assembly may be difficult. In other words, it may be difficult to distort the sealing element 108 a sufficient amount to place it into the bore of the backing ring 132. With the two piece backing ring design, the two pieces 200, 202 can be separated and pushed together around the sealing element 108 to facilitate assembly. In some examples, the two backing ring pieces 200, 202 are joined to one another by threads. As shown, the first piece 200 has a threaded bore for receiving the threaded stem from the second piece 202.

In an alternative embodiment, the supported face seal assembly 156 of FIG. 10 may be reversed and configured as a supported external face seal assembly, similar to the supported face seal assembly of FIG. 2. However, the support surface 146 and the exterior surface 150 of the alternative embodiment of FIG. 10 are contoured with similar but reversed orientation from that of FIG. 10.

Analogous methods of making and of using the supported face seal assembly of FIG. 10 are understood to be encompassed herein.

Although limited embodiments of face seal assemblies and supported face seal assemblies, their components, and related methods have been specifically described and illustrated herein, many modifications and variations will be apparent to those skilled in the art. For example, the various contoured surfaces may be modified so long as a concave surface is provided to support a convex surface or vice versa and so long as the sealing element and the backing ring are arranged in a telescoping arrangement. Furthermore, it is understood and contemplated that features specifically discussed for one face seal embodiment may be adopted for inclusion with another face seal embodiment, provided the functions are compatible. Accordingly, it is to be understood that the face seal assemblies and supported face seal assemblies, their components, and related methods constructed according to principles of the disclosed devices, systems, and methods may be embodied other than as specifically described herein. The disclosure is also defined in the following claims.

What is claimed is:

1. An interlocking face seal assembly comprising:
   a sealing element with an exterior surface, the exterior surface being a convex outer surface or a concave outer surface relative to a centerline of the seal assembly, the sealing element having a spring located in a spring cavity defined by two sealing flanges and a center channel section and wherein the spring contacts the two sealing flanges;
   a backup ring with an inner surface relative to the centerline of the seal assembly, a first side surface, a second side surface generally parallel to the first side surface, and a remote surface opposite the inner surface, said inner surface defining a bore and comprising a convex inner surface or a concave inner surface;
   whereby the concave inner surface of the backup ring accepts at least a portion of the convex outer surface of the sealing element or the convex inner surface of the backup ring accepts at least a portion of the concave outer surface of the sealing element and the sealing element is retained within the bore of the backup ring; and
   whereby the remote surface of the backup ring is tapered from the first side surface to the second side surface and configured to press against a tapered back wall of a groove that receives the interlocking face seal assembly, the remote surface being away from the sealing element.

2. The interlocking face seal assembly of claim 1, wherein an outermost diameter of the sealing element is larger than an innermost diameter of backup ring.

3. The interlocking face seal assembly according to claim 1, wherein an outermost diameter of the backup ring is larger than an innermost diameter of sealing element.

4. The interlocking face seal assembly according to claim 1, whereby radial deflection of the sealing element or backup ring is required for assembly.

5. The interlocking face seal assembly according claim 1, whereby the concave surface comprises a radiused, tapered, or chamfered edge.

6. The interlocking face seal assembly of claim 1, wherein the spring is a canted coil spring, a V-spring, or a ribbon spring.

7. The interlocking face seal assembly of claim 1, wherein the backup ring comprises a first backing ring part attached to a second backing ring part.

8. The interlocking face seal assembly of claim 1, wherein the inner surface of the backup ring has a different contour than the exterior surface of the backup ring to shape the direction or manner of compression of the sealing element against the backing ring.

9. The interlocking face seal assembly of claim 1, wherein the backup ring is made of a harder material than a material of the sealing element.

\* \* \* \* \*